June 19, 1956  C. H. MAY  2,750,934
TWO-DIRECTION ENGINE STARTER
Filed March 17, 1951

INVENTOR.
Claude Hector May
BY Gray, Mase
& Dunson
ATTORNEYS.

United States Patent Office 2,750,934
Patented June 19, 1956

2,750,934
TWO-DIRECTION ENGINE STARTER

Claude Hector May, Columbus, Ohio, assignor to The Murray Corporation of America, a corporation of Delaware Application March 17, 1951, Serial No. 216,181

6 Claims. (Cl. 123—179)

This invention relates to engine starters. It has to do more particularly with starting and reversing means for engines, such means being especially adapted to engines of the two-stroke type which have the inherent property of being able to run in either rotational direction.

It is a primary object of the invention to provide a starting mechanism for an engine. It is also an object to provide starting and reversing means for engines, capable of starting an engine in either direction, and avoiding any necessity, particularly in automotive use, for providing the usual reverse gear. Other objects and advantages of the present invention are apparent from the disclosure herein.

Figure 2:
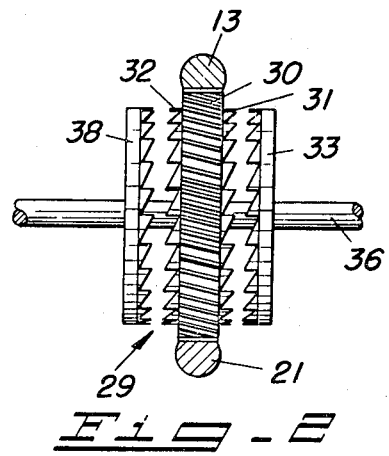
Fig. 2 is an end view, partially in section, of the mechanism of Fig. 1.
Figure 3:
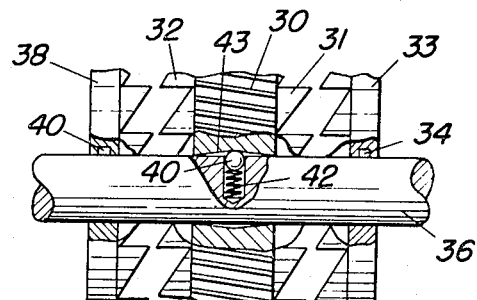
Fig. 3 is an enlarged view, partially in section, of a portion of Fig. 2.

Referring to the drawings, cylinders 10—10 are connected by means of pipes 11—11 to a suitable source of fluid supply. This fluid is preferably air, but may be any desired fluid. Positioned within upper cylinder 10 is piston 12, provided with piston rod 13, rigidly secured thereto, and equipped with rack teeth 14 on the under side thereof. Spring 15 abutting against shoulder 17 normally urges piston 12 toward the right-hand end of the cylinder. Lower cylinder 10 is provided with a similar piston 20 having rigidly connected thereto a piston rod 21 provided with rack teeth 23 on the upper side thereof. Spring 24, abutting against shoulder 25, normally urges piston 20 toward the right-hand end of cylinder 10. Positioned in casing 28 is starter wheel 29, which is provided with pinion teeth 30 which are helically cut, as shown in Figs. 2 and 3, and which are adapted to engage corresponding helically cut teeth 14 and 23 on racks 13 and 21. Positioned at the periphery of the side of pinion wheel 29 are oppositely disposed ratchets 31 and 32 (see Figs. 2 and 3). Ratchet 31 is adapted to engage ratchet wheel 33 which, by means of key 34 (see Fig. 3) is fixedly secured to shaft 36. Likewise, ratchet teeth 32 are adapted to engage ratchet wheel 38, which is also fixedly attached to shaft 36 by means of key 40. Pinion wheel 29 is freely positioned on shaft 36, and normally remains in a central position thereon by means of ball 40, radially urged from shaft 36 by means of spring 42. The inner shaft engaging portion 43 of pinion wheel 29 is in the shape of two conical frustums placed base to base.

Figure 1:
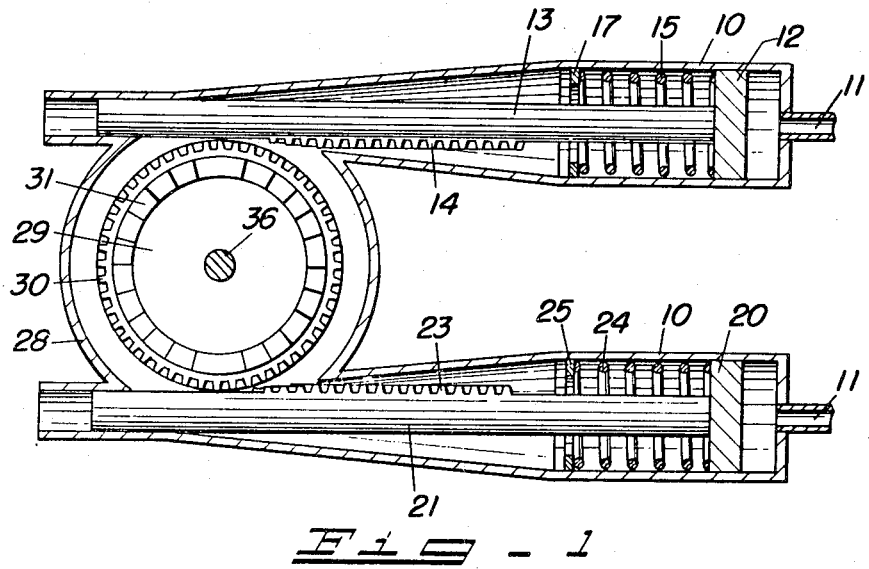
Fig. 1 is a side-elevation view, partially in section, showing a starting mechanism according to the present invention.

The operation of this device is as follows: Let us assume that fluid under pressure is admitted to upper cylinder 10. This causes movement of racks 13 toward the left, thereby causing pinion wheel 29 to rotate in a counterclockwise direction. However, since the teeth on pinion wheel 29 are helically cut, and the teeth on rack 14 are similarly helically cut, movement of pinion wheel 29 is also effected in a left-hand direction, as viewed in Figs. 2 and 3. The net result is not only to rotate pinion wheel 29 counterclockwise, as shown in Fig. 1, but also to slide it on shaft 36 in a left-hand direction, as shown in Figs. 2 and 3. This causes ratchet teeth 32 to engage ratchet wheel 38, which causes shaft 36 to rotate in a similar counterclockwise direction, as viewed in Fig. 1. Shaft 36, which, of course, is connected to the engine, will increase in rotational speed as soon as the engine starts, and the resulting higher rotational speed of ratchet wheel 38 will cause it to slide pinion wheel 29 to the right, as shown in Fig. 2. If pinion wheel 29 were to slide past a neutral center point and become engaged with ratchet wheel 33, which wheel is rotating in the same direction, of course, as wheel 38, the result would be to destroy the teeth on pinion wheel 29 and the teeth 14 on rack 13. Therefore, provision is made to limit the movement of pinion 29 axially when it is thrown back by its original starting ratchet wheel. Ball 40 (see Fig. 3) insures that pinion wheel 29, when thrown in a right-hand direction by the excess speed of ratchet wheel 38, will not engage ratchet wheel 33, since the axial movement of pinion wheel 29 is limited by ball 40.

Upon starting, the pressure in the upper cylinder 10 is immediately reduced, thereby permitting spring 15 to return rack 14 to its right-hand position.

Let us suppose that it is desired to start the engine in an opposite direction. Fluid would be introduced to lower cylinder 10, thereby causing rack 21 to move in a left-hand direction. This will cause pinion wheel 29 to rotate in a clockwise direction and, since the wheel is helically cut, as are the teeth 23 of rack 21, the net result is not only to turn pinion wheel 29 in a clockwise direction, but also to move it to the right on shaft 36, as viewed in Figs. 2 and 3, into engagement with ratchet wheel 33, thereby causing shaft 36 to rotate in a corresponding clockwise direction. As ratchet wheel 33 rotates faster than pinion wheel 29, it will cause pinion wheel 29 to be thrown in a left-hand direction, but the pressure of ball 40 against the under side of pinion wheel 29 will prevent that wheel from traveling too far and into engagement with ratchet wheel 38.

While this invention has been described in its preferred embodiment, it is to be understood that the words used are words of description rather than of limitation, and that changes within the purview of the appended claims may be made without departing from the true scope and spirit of this invention.

What is claimed is:

1. A starting device comprising two, oppositely disposed, fluid pressure operated racks, said racks having oppositely cut helical teeth, a pinion wheel freely positioned on a shaft between, and adapted to cooperate with, said racks, said pinion wheel being provided with oppositely disposed, and oppositely engageable axially extending, ratchet teeth on the periphery thereof, and two ratchet wheels, each of which is fixedly positioned on said shaft on either side of said pinion wheel, said wheels being provided with ratchet teeth adapted to cooperate with the ratchet teeth on said pinion wheel.

2. A starting device comprising two, oppositely disposed, fluid pressure operated racks, said racks having oppositely cut helical teeth, a pinion wheel freely positioned on a shaft between, and adapted to cooperate with, said racks, said pinion wheel being provided with oppositely disposed and oppositely engageable axially extending, ratchet teeth on the periphery thereof, means for limiting the free axial movement of said pinion wheel, and two ratchet wheels, each of which is fixedly positioned on said shaft on either side of said pinion wheel, said wheels being provided with ratchet teeth adapted to cooperate with the ratchet teeth on said pinion wheel.

3. A starting device for an engine including, in combination, a gear slidably and rotatably mounted on the drive shaft of the engine, having helical teeth thereon which cause the gear when driven to move axially on the shaft in either direction depending upon the direction in which the helical gear is rotated, drive means on each side of the gear, one for clockwise rotation the other for counterclockwise rotation, drive means on the shaft positioned to be engaged by the drive means on the gear when the gear shifts toward one or the other of the drive means on the shaft when driven for driving the shaft in one or the other direction, and means for driving said helical gear in either direction.

4. A starting device for an engine including, in combination, a gear slidably and rotatably mounted on the drive shaft of the engine, having helical teeth thereon which cause the gear when driven to move axially on the shaft in either direction depending upon the direction in which the helical gear is rotated, drive means on each side of the gear, one for clockwise rotation the other for counterclockwise rotation, drive means on the shaft positioned to be engaged by the drive means on the gear when the gear shifts toward one or the other of the drive means on the shaft when driven for driving the shaft in one or the other direction, and means for driving said helical gear in either direction, said last means embodying rack means which is capable of being driven in opposite directions.

5. A starting device for an engine including, in combination, a gear slidably and rotatably mounted on the drive shaft of the engine, having helical teeth thereon which cause the gear when driven to move axially on the shaft in either direction depending upon the direction in which the helical gear is rotated, drive means on each side of the gear, one for clockwise rotation the other for counterclockwise rotation, drive means on the shaft positioned to be engaged by the drive means on the gear when the gear shifts toward one or the other of the drive means on the shaft when driven for driving the shaft in one or the other direction, and means for driving said helical gear in either direction, said last means embodying rack means which is capable of being driven in opposite directions, said rack means embodying a pair of racks engaging the gear at diametrically opposite points and movable in the same direction for rotating the gear in opposite directions.

6. A starting device for an engine including, in combination, a gear slidably and rotatably mounted on the drive shaft of the engine, having helical teeth thereon which cause the gear when driven to move axially on the shaft in either direction depending upon the direction in which the helical gear is rotated, drive means on each side of the gear, one for clockwise rotation the other for counterclockwise rotation, drive means on the shaft positioned to be engaged by the drive means on the gear when the gear shifts toward one or the other of the drive means on the shaft when driven for driving the shaft in one or the other direction, means for driving said helical gear in either direction, said last means embodying rack means which is capable of being driven in opposite directions, said rack means embodying a pair of racks engaging the gear at diametrically opposite points and movable in the same direction for rotating the gear in opposite directions, and driving means for said racks which are independently actuated.

References Cited in the file of this patent

UNITED STATES PATENTS

| | | |
|---|---|---|
| 1,043,399 | Cole | Nov. 5, 1912 |
| 1,128,442 | Guyot | Feb. 16, 1915 |
| 1,513,652 | Swanson | Oct. 28, 1924 |
| 1,751,189 | Berger | Mar. 18, 1930 |
| 1,878,220 | Willshow | Sept. 20, 1932 |
| 1,914,881 | Buehring | June 20, 1933 |
| 2,095,807 | Gier | Oct. 12, 1937 |
| 2,287,627 | Malsbary | June 23, 1942 |
| 2,292,662 | Sanders | Aug. 11, 1942 |
| 2,358,271 | Williams | Sept. 12, 1944 |
| 2,451,216 | Halfarson | Oct. 12, 1948 |
| 2,452,247 | Larsh | Oct. 26, 1948 |